Nov. 7, 1939.   J. H. JERRELL ET AL   2,179,185
MULTIPLE DOUBLE ACTION CONNECTING ROD AND CRANKPIN ASSEMBLY
Filed July 1, 1938    2 Sheets-Sheet 1

Inventor
Joseph H. Jerrell
Joseph M. Jerrell, Jr.

By Clarence A. O'Brien
and Hyman Berman
Attorneys

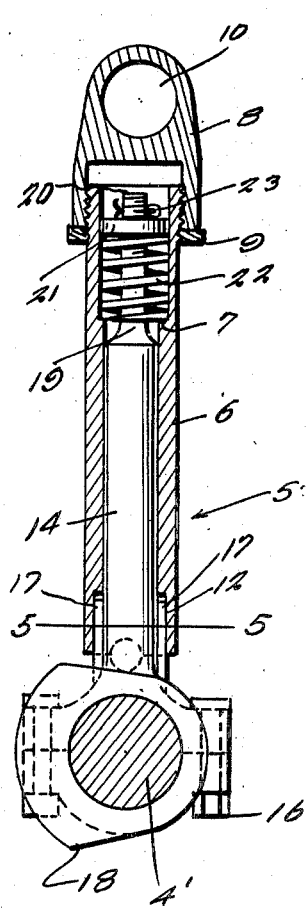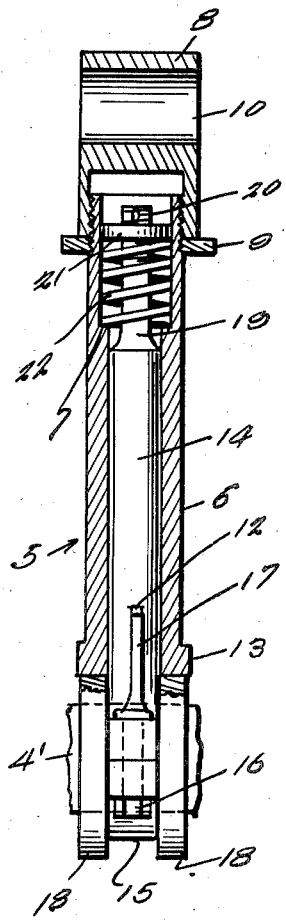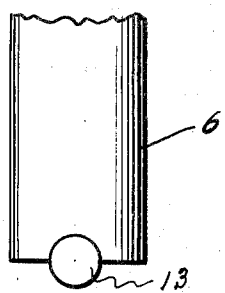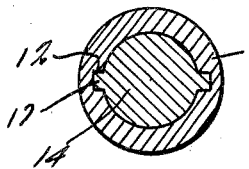

Patented Nov. 7, 1939

2,179,185

UNITED STATES PATENT OFFICE 2,179,185

MULTIPLE DOUBLE ACTION CONNECTING ROD AND CRANKPIN ASSEMBLY

Joseph H. Jerrell and Joseph M. Jerrell, Jr., New Orleans, La.

Application July 1, 1938, Serial No. 216,944

1 Claim. (Cl. 74—36)

This invention relates to an improved connecting rod for connecting a piston with the crank pin and a crank pin having cams thereon, the parts being so constructed and arranged as to delay the point of maximum power expansion until the crank pin has reached a more advantageous crank angle past upper dead center at which point the piston starts moving downward on its power stroke, thereby increasing the power and economy of operation of internal combustion engine provided with the invention.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which—

Figure 2 is a longitudinal sectional view through the improved connecting rod and the crank pin with the cams thereon.

Figure 3 is a similar view but taken at right angles to Figure 2.

Figure 4 is a view of the lower end of the tubular member of the connecting rod.

Figure 5 is a section on the line 5—5 of Figure 2.

Figure 1:
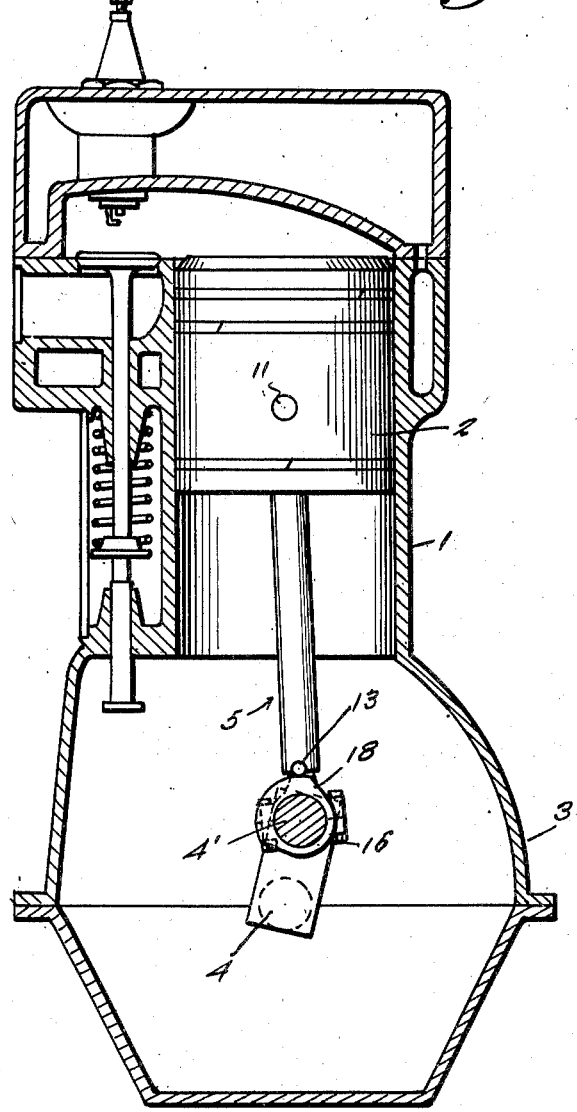
Figure 1 is a vertical sectional view through an internal combustion engine constructed in accordance with this invention.

In these drawings, the numeral 1 indicates the piston block having the piston 2 therein and the numeral 3 indicates the crankcase having the crankshaft 4 passing therethrough and the numeral 5 indicates generally the improved connecting rod. This rod is composed of the tubular member 6 having the upper end of its bore enlarged, the junction of the enlarged part with the main part forming a shoulder 7. A cap member 8 has a threaded socket therein for receiving the upper threaded end of the tubular member 6 and a lock nut 9 holds the parts in adjusted position. The cap member has the transverse bore 10 therein for receiving the wrist pin 11 of the piston 2. The lower end of the tubular member is formed with the longitudinally extending keyways 12 and at diametrically opposite points circular enlargements 13 are formed on the lower end of the tubular member, these enlargements having portions projecting below said lower end as more clearly shown in Figure 4. A stem 14 is slidably arranged in the tubular member and has an enlarged lower end provided with a semicircular recess to fit over a portion of the crankpin 4′, a half bearing part 15 receiving the other part of the crank pin and this part 15 being connected to the enlarged lower end of the stem by the bolts 16. The stem is provided with keys 17 engaging the keyways 12 and cams 18 are carried by the pin 4′ and engage the projections 13. The other end of the stem is reduced as shown at 19 with the extremity threaded as at 20 to receive a nut 21. A spring 22 encircles the reduced part 19 and has its upper end bearing against the nut 21 and its lower end against the shoulder 7, a cotter pin 23 being passed through the reduced part 20 for holding the nut 21 in adjusted position.

Thus it will be seen that the tubular member 6 of the connecting rod is attached to the wrist pin of the piston and the stem 14 is connected with the crank pin 4′ the spring 22 tending to force the tubular member downwardly so as to hold the parts 13 against the cams 18, said cams being formed as shown more clearly in Figure 2.

The parts are so constructed and arranged that after the crank pin reaches a high position to raise the piston, the cams 18 acting on the parts 13 will start to raise the tubular part 6 against the action of the spring 22 so as to raise the piston to a higher point than that to which it has been raised by the crank pin which results in a maximum compression after the crank pin has passed dead center, at which point ignition occurs with the maximum combustion pressure. Thus this invention will substantially increase the power and economy of operation of internal combustion engine equipped with the invention.

The cams may start their lift before upper dead center and end the lift at any advantageous point past upper dead center. While the parts 13 are shown as semi-circular projections at the end of the rod 5 it is to be understood that these projections may be hardened steel roller bearings or ball bearings or made of any other shape to reduce friction. Also while the drawings show the parts 6 and 14 of circular shape in cross section these parts may be of any suitable cross sectional shape to provide a telescoping action.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A connecting rod for connecting a piston to a crankshaft comprising a tubular member, a cap threaded to one end of the member and adapted to be connected with a piston, a stem slidably arranged in the tubular member and having its lower end adapted to engage the crank of the crankshaft, an internal shoulder in the tubular member, a projection on the upper end of the stem, a coil spring having its lower end bearing against the shoulder and its upper end against the projection and a projection on the lower end of the tubular member for engagement by a cam on the crankshaft.

JOSEPH H. JERRELL.
JOSEPH M. JERRELL, JR.